Aug. 6, 1957 B. READ 2,802,183

MICROWAVE MODULATOR

Filed June 4, 1954

Bruce Read
*INVENTOR.*

BY [signature]

*ATTORNEY*

United States Patent Office 2,802,183
Patented Aug. 6, 1957

2,802,183
MICROWAVE MODULATOR

Bruce Read, East Pepperell, Mass., assignor to Sanders Associates, Incorporated, Nashua, N. H., a corporation of Massachusetts Application June 4, 1954, Serial No. 434,361

7 Claims. (Cl. 332—44)

The present invention relates to the art of modulating high frequency electromagnetic energy. More particularly, this invention relates to attenuation and modulation of high frequency electromagnetic energy as propagated in wave guides and other transmission lines.

In the prior art, there exists a wave guide attenuator and modulator, U. S. Patent No. 2,629,079, T. Miller et al., issued February 17, 1953, disclosing a device designed for a somewhat similar purpose employing an alternating magnetic field transverse to the direction of propagation of the energy.

It is an object of the present invention to provide an improved electromagnetic modulator involving no mechanically moving parts.

It is a further object of the present invention to provide an improved electromagnetic modulator capable of employing an alternating magnetic field.

A still further object of the present invention is to provide an improved electromagnetic modulator which is capable of producing sideband frequencies and suppressing the original carrier frequency of energy propagated therethrough.

It is therefore an object of the present invention to provide an improved microwave modulator providing balanced modulation with enhanced carrier suppression.

Other and further objects of the invention will be apparent from the description of typical embodiments thereof, taken in connection with the following description and accompanying drawings.

In accordance with the invention, there is provided a microwave modulator for microwave electromagnetic energy for prdoucing output sideband frequency signals while suppressing input carrier and modulation signals. The modulator comprises a transmission line adapted to receive and propagate an input carrier signal of microwave, plane-polarized electromagnetic energy characterized by an electric vector having a first predetermined direction of polarization. Ferromagnetic material is disposed within the transmission line and is adapted to propagate the energy therethrough. Dielectric insulating means hold the ferromagnetic material in insulated, spaced relation to the transmission line. Means are provided for applying an input modulation signal of a magnetic field, which alternates at a predetermined modulation frequency, through the ferromagnetic material in the direction of propagation of the energy for rotating the electric vector within the transmission line. Output means are connected to the transmission line and adapted to propagate the energy with the electric vector having a second predetermined direction of polarization to provide the output sideband frequency signal while suppressing the input modulation and carrier signals. Means are further provided for applying a static magnetic field transversely through the ferromagnetic material to further suppress the input carrier signal.

In one embodiment of the invention, the ferrite material is formed in a rod which is axially disposed in the direction of propagation.

In another embodiment of the invention, the transmission line includes an input, elongated, rectangular wave guide section having one dimension less than one-half of one wave length at the highest operating frequency of the guide, and is adapted to receive and propagate an input carrier signal of microwave, plane-polarized, electromagnetitc energy characterized by an electric vector having a first predetermined direction of polarization. A cylindrical wave guide is coupled to the input rectangular guide and is adapted further to propagate the energy. The ferromagnetic rod is disposed within the cylindrical guide. An inductive coil surrounds the cylindrical guide and is coaxial therewith to provide an alternating magnetic field axially through the rod. An output, elongated, rectangular wave guide is coupled to the cylindrical wave guide and has one dimension less than one-half of a wave length at the frequency of the energy. The sides of the output rectangular wave guide are prependicular to the respective sides of the input rectangular wave guide.

In still another embodiment of the invention, the transmission line consists of a cylindrical wave guide, sections of which are adapted for receiving the carrier signal, modulating the signal and propagating the output signal.

Figures 1, 2, 3:
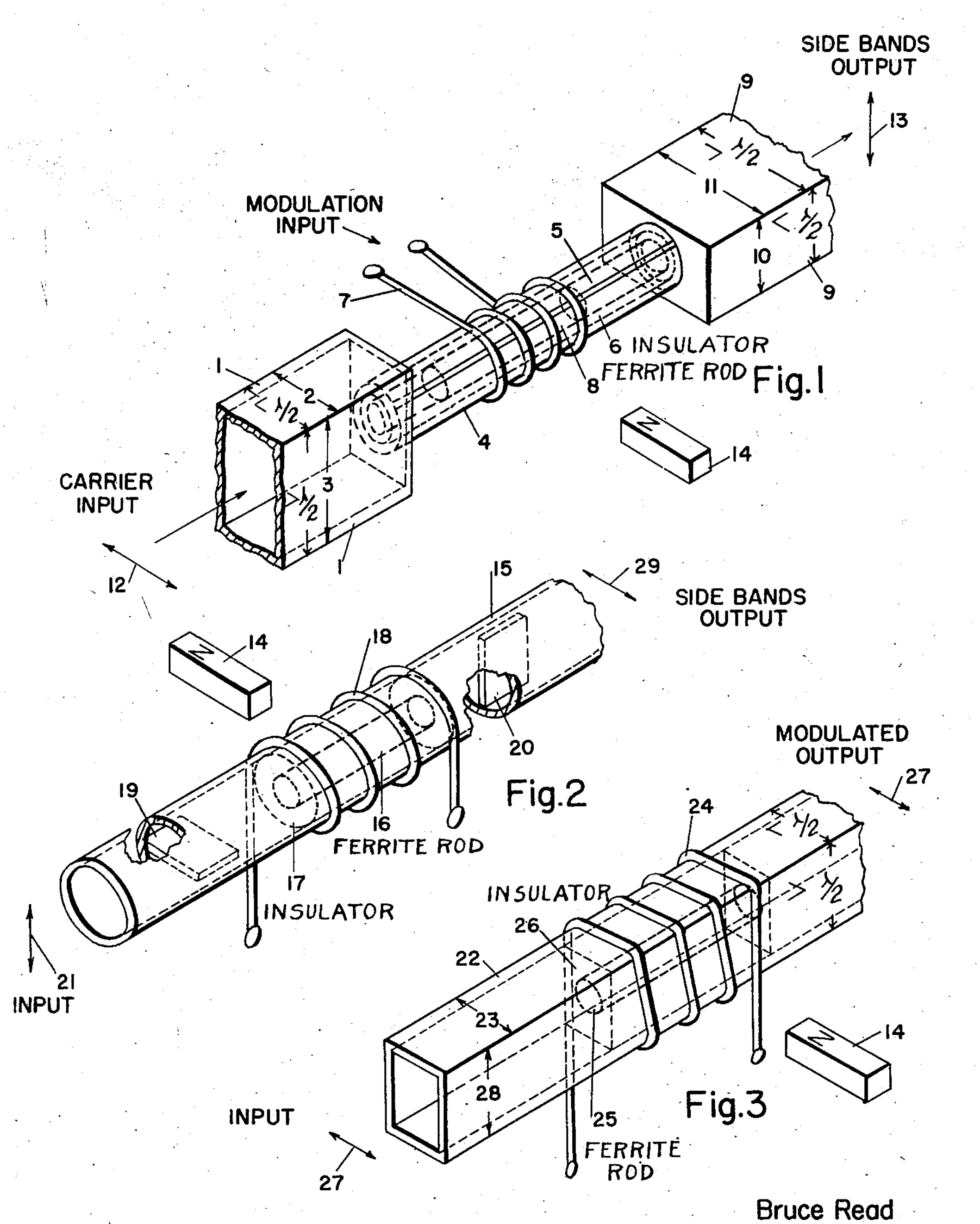
Fig. 1 is a three-dimensional, fragmentary view, of a preferred embodiment of the present invention.
Fig. 2 is a three-dimensional, fragmentary view of another embodiment of the present invention.
Fig. 3 is a three-dimensional, fragmentary view of still another embodiment of the present invention.

With particular reference to Fig. 1, an input wave guide 1, constructed, for example of copper, has a transverse dimension 2 less than a half-wave long (for example, 0.5 inch) at the operating frequency, for example 10 kilo-megacycles. The other transverse dimension 3 is a greater than a half-wave long at the operating frequency, for example 1 inch. A cylindrical wave guide 4 is electrically and mechanically coupled to the input guide 1 as shown. The cylindrical guide 4 comprises a metallic foil 5 formed, for example, of copper having a thickness of .050 inch, which surrounds a cylindrical insulator 6. The foil 5 is coated with a layer of insulation such as polyethylene lacquer or other insulating material, and its length is so chosen as to provide a longitudinal slot as shown (for example, .063 inch). The insulator 6 is fabricated from Rexolite (a material manufactured by Rex Corporation, West Acton, Massachusetts, and has, for example, an outer diameter of .625 inch). A .25 inch hole passes centrally therethrough in which is disposed a rod 8 of ferro-magnetic material. The term "ferro-magnetic" as used herein includes paramagnetic as distinguished from diamagnetic. The rod 8 may be, for example, 1.234 inches long and .234 inch in diameter and composed of ML 1331 ferrite material such as is manufactured by General Ceramics and Steatite Corportaion. A coil 7, formed for example from #16 enameled solid wire, surrounds the guide 4 as shown. An output wave guide 9 has a rectangular cross-section with a dimension indicated at 10 less than a half-wave length long (for example .5 inch) and the dimension indicated at 11 greater than a half-wave length long (for example 1.0 inch). The guide 9 is disposed such that its dimension 10 is perpendicular to the dimension 2 of the guide 1.

A biasing magnetic field (for example 200 to 400 gauss) is provided by the bar magnet 14. Microwave electromagnetic energy characterized by an electric vector, having polarity in the direction as shown at 12, is coupled to the guide 1 in the well known manner. A high frequency modulating voltage, for example 5 megacycles, is applied to the coil 7 to cause an alternating magnetic current to flow longitudinally through the ferrite rod 8. In accordance with the so-called ferro-magnetic Farraday effect as applied to microwave energy, the magnetic current parallel to the rod 8 causes the electric vector of the energy to rotate in accordance with the variations of the current (see Farraday effect as outlined by J. H. Rowen in an article entitled "Ferrite and microwave applications," published in the Bell System Technical Journal, vol. 32, #6, November 1953).

The amount of rotation that takes place is also a function of the length and diameter of the ferrite rod. In the preferred embodiments, the electric vector rotates ±45 degrees about a mean position determined by the steady-state transverse magnetic field. That is to say, it rotates 45 degrees clockwise and 45 degrees counterclockwise in accordance with the maximum amplitudes in opposite polarities of the magnetic current.

As is well known in the art, the guide 9 propagates that component of electromagnetic energy having an electric vector polarized in the direction as shown at 13. In the output of the guide 9 the energy is characterized by sideband frequency components, for example 10 kilo-megacycles ±5 megacycles. In the presence of a weak magnetic field, such as provided by the magnet 14, the 10 kilo-megacycle carrier may be suppressed 20 db below the sideband frequencies.

The modulating frequencies that may be applied to the device as described range from zero cycles per second and have a maximum value limited only by the carrier frequency. The slot formed by the foil 5 as shown prevents losses in the sideband frequencies due to the existence of a shorted turn.

In the embodiment of Fig. 2 a cylindrical wave guide 15 (.625 inch inner diameter, for example) surrounds a ferrite rod 16 supported in a cylindrical dielectric 17. A coil 18 surrounds the guide as shown. Septa 19 and 20 are provided as shown. The septum 19 is a relatively thin rectangular sheet of metal attached along a diameter of the guide parallel to the direction of the propagation of the energy therein and perpendicular to its electric vector. The septum 20 is similarly attached, but transversely disposed perpendicular to the septum 19. The energy fed to the guide at its input at a frequency of 10 kilo-megacycles, for example, has an electric vector polarized in the direction as shown at 21. Since the electric vector is perpendicular to the septum 19 and parallel to the septum 20, it is propagated by the former and reflected by the latter.

Upon the application of a modulating voltage, for example 5 megacycles, to the coil 18, an alternating magnetic current passes longitudinally through the rod 16. Energy passing the rod 16 is characterized by a rotating vector having instantaneous positions at times perpendicular and at times parallel to the septum 20. Since the septum 20 permits only that component of the energy having an electric vector perpendicular thereto to pass (as shown at 29), only the sideband frequencies appear in the output of the guide. The carrier is suppressed.

Referring now to Fig. 3, a rectangular wave guide 22 having a transverse dimension 23 less than a half-wave length at the operating frequency (for example .5 inch at 10 kilo-megacycles) is surrounded by modulating coil 24 and insulated therefrom. A ferrite rod 25 is disposed within the guide 22 and held in insulated spaced relation thereto by a dielectric block 26, for example Rexolite. In this embodiment, microwave energy characterized by an electric vector polarized in the direction as shown at 27, is applied to the input of the guide 22. A modulating voltage, for example 5 megacycles, is applied to the coil 24 to produce an alternating magnetic current passing longitudinally through the rod 25. The guide 22 effectively attenuates electromagnetic energy characterized by an electric vector having a polarity in a direction different from that as shown at 27. Since the energy passing through the guide in the vicinity of the rod 25 is characterized by a rotating electric vector, a portion thereof will be sharply attenuated. This embodiment produces the amplitude modulated carrier in the output.

The use of the present invention greatly enhances modern microwave techniques. From the above description the application of the present invention to problems of modulation, attenuation and so forth is obvious.

While there has been hereinbefore described what is at present considered preferred embodiments of the invention, it will be apparent that many and various changes and modifications may be made with respect to the embodiments illustrated without departing from the spirit of the invention. It will be understood, therefore, that all such changes and modifications as fall fairly within the scope of the present invention, as defined in the appended claims, are to be considered as a part of the present invention.

What is claimed is:

1. A microwave modulator for producing output sideband frequency signals, while suppressing input carrier and modulation signals, comprising: a transmission line adapted to receive and propagate an input carrier signal of microwave, plane-polarized, electromagnetic energy characterized by an electric vector having a first predetermined direction of polarization; ferromagnetic material disposed within said transmission line and adapted to propagate said energy therethrough; dielectric, insulating means holding said ferromagnetic material in insulated, spaced relation to said transmission line; means applying an input modulation signal of a magnetic field alternating at a predetermined modulation frequency through said ferromagnetic material in the direction of propagation of said energy for rotating said electric vector within said transmission line; output means connected to said transmission line and adapted to propagate said energy with said electric vector having a second predetermined direction of polarization to provide said output sideband frequency signals while suppressing said input modulation and carrier signals; and means applying a static magnetic field transversely through said ferromagnetic material to further suppress said input carrier signal.

2. A microwave modulator for producing output sideband frequency signals, while suppressing input carrier and modulation signals, comprising: a transmission line adapted to receive and propagate an input carrier signal of microwave, plane-polarized, electromagnetic energy characterized by an electric vector having a first predetermined direction of polarization; a rod of ferrite material axially disposed in the direction of propagation within said transmission line; dielectric, insulating means holding said rod in insulated, spaced relation to said transmission line; means applying an input modulation signal of a magnetic field alternating at a predetermined modulation frequency through said rod in the direction of propagation of said energy for rotating said electric vector within said transmission line; output means connected to said transmission line and adapted to propagate said energy with said electric vector having a second predetermined direction of polarization to provide said output sideband frequency signals while suppressing said input modulation and carrier signals; and means applying a static magnetic field transversely through said rod to further suppress said input carrier signal.

3. A microwave modulator for producing output sideband frequency signals while suppressing input carrier and modulation signals comprising an input, elongated, rectangular waveguide section having one dimension less than one-half of one wavelength at the highest operating frequency of said guide and adapted to receive and propagate an input carrier signal of microwave, plane-polarized, electromagnetic energy characterized by an electric vector having a first predetermined direction of polarization; a cylindrical waveguide coupled to said rectangular guide and adapted to propagate said energy; a rod of ferromagnetic material disposed within said cylindrical guide; dielectric insulating means holding said rod in insulated spaced relation to said cylindrical guide; an inductive coil surrounding said cylindrical waveguide and coaxial therewith to provide an alternating magnetic field passing axially through said rod to effect transmission of said energy with rotation of its electric vector in accordance with variations of said alternating field; an output, elongated, rectangular waveguide coupled to said cylindrical waveguide and having one dimension less than one-half of a wavelength at the frequency of said energy, the sides of said output rectangular waveguide being perpendicular to the respective sides of said input rectangular waveguide to provide said output sideband frequency signals while suppressing said input and carrier signals; and means applying a static magnetic field transversely through said rod to further suppress said input carrier signal.

4. A microwave modulator for producing output sideband frequency signals, while suppressing input carrier and modulation signals, comprising: a cylindrical waveguide adapted to receive and propagate an input carrier signal of microwave, plane-polarized, electromagnetic energy characterized by an electric vector having a first predetermined direction of polarization; a rod of ferromagnetic material disposed within said cylindrical guide; dielectric insulating means holding said rod in insulated spaced relation to said guide; means applying an input modulation signal of a magnetic field alternating at a predetermined modulation frequency axially through said rod to effect transmission of said energy with rotation of its electric vector in accordance with variations of said magnetic field; attenuation means connected in the output of said guide and adapted to propagate said energy with said electric vector having a second predetermined direction of polarization perpendicular to said first direction of polarization to provide said output sideband frequency signals while suppressing input and modulation carrier signals; and means applying a static magnetic field transversely through said rod to further suppress said input carrier signal.

5. A microwave modulator for producing output sideband-frequency signals, while suppressing input carrier and modulation signals, comprising: a transmission line adapted to receive and propagate an input carrier signal of microwave, plane-polarized, electromagnetic energy characterized by an electric vector having a first predetermined direction of polarization; ferromagnetic material disposed within said transmission line and adapted to propagate said energy therethrough; dielectric, insulating means holding said ferromagnetic material in insulated, spaced relation to said transmission lines; means surrounding said transmission line in the vicinity of said ferromagnetic material for applying an input modulation signal of a magnetic field, alternating at a predetermined modulation frequency, through said ferro-magnetic material in the direction of propagation of said energy for rotating said electric vector within said transmission line; output means connected to said transmission line and adapted to propagate said energy with said electric vector having a second predetermined direction of polarization to provide said output sideband frequency signals while suppressing said input modulation and carrier signals; and means adjacent said transmission line in the vicinity of said ferromagnetic material for applying a static magnetic field transversely through said ferromagnetic material to further suppress said input carrier signal.

6. A microwave modulator for producing output sideband-frequency signals, while suppressing input carrier and modulation signals, comprising: a transmission line adapted to receive and propagate an input carrier signal of microwave, plane-polarized, electromagnetic energy characterized by an electric vector having a first predetermined direction of polarization; ferromagnetic material disposed within said transmission line and adapted to propagate said energy therethrough; dielectric, insulating means holding said ferromagnetic material in insulated, spaced relation to said transmission line; means surrounding said transmission line in the vicinity of said ferromagnetic material for applying an input modulation signal of a magnetic field, alternating at a predetermined modulation frequency, through said ferromagnetic material in the direction of propagation of said energy for rotating said electric vector within said transmission line; output means connected to said transmission line and adapted to propagate said energy with said electric vector having a second predetermined direction of polarization to provide said output sideband frequency signals while suppressing said input modulation and carrier signals; and permanent magnet means adjacent said transmission line in the vicinity of said ferromagnetic material for applying a static magnetic field transversely through said ferromagnetic material to further suppress said input carrier signal.

7. A microwave modulator for producing output sideband frequency signals, while suppressing input carrier and modulation signals, comprising: an input, elongated, rectangular wave guide section having one dimension less than one-half of one wave length at the highest operating frequency of said guide and adapted to receive and propagate an input carrier signal of microwave, plane-polarized, electromagnetic energy characterized by an electric vector having a first predetermined direction of polarization; a cylindrical wave guide coupled to said rectangular guide and adapted to propagate said energy, said cylindrical guide having a longitudinal slot extending therethrough and covered with a layer of insulation to prevent the modulated signal from being short circuited; a rod of ferromagnetic material disposed within said cylindrical guide; dielectric insulating means holding said rod in insulated spaced relation to said cylindrical guide; an inductive coil surrounding said cylindrical wave guide and coaxial therewith to provide an alternating magnetic field passing axially through said rod to effect transmission of said energy with rotation of its electric vector in accordance with variations of said alternating field; an output, elongated, rectangular wave guide coupled to said cylindrical wave guide and having one dimension less than one-half of a wave length at the frequency of said energy, the sides of said output rectangular wave guide being perpendicular to the respective sides of said input rectangular wave guide to provide said output sideband frequency signals while suppressing said input and carrier signals; and means adjacent said cylindrical guide in the vicinity of said rod for applying a static magnetic field transversely through said rod to further suppress said input carrier signal.

References Cited in the file of this patent

UNITED STATES PATENTS

| | | |
|---|---|---|
| 2,402,948 | Carslon | July 2, 1946 |
| 2,441,598 | Robertson | May 18, 1948 |

OTHER REFERENCES

Journal of Applied Physics, pp. 109–110, January 1953.

Electronics, October 1953, pages 246, 248, 250, 252, 254.